United States Patent [19]

Lambie

[11] Patent Number: 4,564,845
[45] Date of Patent: Jan. 14, 1986

[54] DEVICE TO AID IN THE MANUAL RECORDATION OF DATA

[76] Inventor: Rosemary A. Lambie, 528 Rossmore Rd., Richmond, Va. 23225

[21] Appl. No.: 625,625

[22] Filed: Jun. 28, 1984

[51] Int. Cl.⁴ .......................... G01D 9/00; G01D 9/42
[52] U.S. Cl. .................................... 346/17; 346/104; 362/97; 368/107
[58] Field of Search ................... 346/17, 104; 362/97, 362/800, 812; 368/107, 108, 239, 240

[56] References Cited

U.S. PATENT DOCUMENTS 3,653,058  3/1972  Sundberg ............................ 346/104

OTHER PUBLICATIONS

"An Analysis of Teacher Management Techniques for Conduct-Disordered Pupils in Regular and Special Classrooms", by Rosemary A. Lambie, Oct. 1978.

*Primary Examiner*—E. A. Goldberg
*Assistant Examiner*—Mark Reinhart
*Attorney, Agent, or Firm*—Cushman, Darby & Cushman

[57] ABSTRACT

A device to aid an operator in the manual recordation of data includes a case body having a surface upon which a record medium is accepted and plural visual light-emitting members in registry with respective discrete areas on the record medium. The light-emitting members are illuminated in accordance with a timed sequence so that the operator need only visually refer thereto to identify the proper area on the record medium upon which data is to be recorded.

10 Claims, 4 Drawing Figures

DEVICE TO AID IN THE MANUAL RECORDATION OF DATA

FIELD OF INVENTION

The present invention relates to the field of devices which aid an operator in recording data, such as time-based data.

BACKGROUND AND SUMMARY OF THE PRESENT INVENTION

The recording of time-based data by an observer can present several problems. For example, to be accurate, data corresponding to a particular time must be recorded in a sequential manner so as to not destroy the time significance of the data. Oftentimes, observers are required not only to watch the activities from which data is obtained but also to observe a time-piece such as a watch, clock or other like time-keeping devices, so as to correlate the observed activity at a given time and to record the proper data corresponding to that time. The data sheet upon which the data is recorded may itself be divided into plural discrete areas each corresponding to a given time during the observation period. Thus, the observer's attention (which should properly be focused upon the activity for which data is being obtained) is usually divided between the activity, the time-piece and the data sheet. As can be appreciated, incomplete and/or inaccurate data is more probable due to the observer's attention being distracted to the time-piece when a data entry is to be recorded.

The present invention addresses the problems associated when time-based data is recorded. Specifically, the present invention includes visual locators, preferably light-emitting diodes or similar equivalent light-emitting members, as the means for identifying a precise location on the data sheet which corresponds to the time in which the observed data is to be recorded. In use, therefore, the present invention provides a distinct aid to an observer by permitting the observer to focus more attention upon the activity for which data is being obtained. When data indicia are to be scribed onto a record medium in dependence upon the observed activity, the observer need only glance at the device of the present invention and, due to the visual locating members thereof, can quickly and easily locate the precise area on the record medium corresponding to the time in which the activity is observed.

Although the present invention can be satisfactorily used to aid an observer in recording any time-based data, the device of the present invention finds particular utility in aiding an observer to record human behavior interactions, such as interactions between a pupil and a teacher. To glean further insight into the teacher/pupil behavior interaction data particularly well suited for being scribed on the device of the present invention, the reader's attention is directed to "An Analysis Of Teacher Management Techniques For Conduct-Disordered Pupils In Regular And Special Classrooms", Lambie (October 1978), the entire disclosure of which is expressly incorporated hereinto by reference.

The present invention generally includes a case body which defines a surface upon which a record medium such as a data sheet or the like is placed. According to one embodiment of the present invention, a row of plural first light-emitting members are disposed along the upper border of the record medium, each thereby identifying a column on the record medium. A column of plural second light-emitting members is disposed at a side margin of the record medium so that each will thus identify a row on the record medium. Discrete pairs of the first and second light-emitting members are illuminated in dependence upon a predetermined timed sequence, each pair thereby visually identifying the column and row, respectively, which establishes the area on the record medium corresponding to a given time. Accordingly, should data indicia be desired to be scribed on the record medium by the operator, the observer need only glance at the device of the present invention and, by virtue of the illuminated first and second light-emitting member pair, will be able to quickly locate the area on the record medium corresponding to that given time.

In accordance with a particularly preferred embodiment of the present invention, the surface upon which the record medium is placed is composed of a light-transparent material e.g. glass, transparent rigid plastic or the like. The case body defines an interior cavity so that the light-emitting members can be disposed therein in a matrix configuration and in a confronting relationship to the interior surface of the transparent member. In such a manner, when one of the light-emitting members is illuminated, the observer will be able to visually perceive the light transmitted through the transparent surface and the record medium so that the particular area corresponding to a given time at which data indicia are to be scribed on the record medium can be easily and visually perceived and identified.

While reference has been herein made to a separate record medium such as a data sheet, the reader should appreciate that the surface of the case body can be integrally provided with markings or the like so as to define the locations and areas thereon in registry with the light-emitting members. Thus, data indicia could be directly scribed onto the surface and subsequently erased. However, when consideration is given to the fact that a permanent record is normally required in most data observation periods, a separable record medium (e.g. data sheet) is preferred.

Other advantages and aspects of the present invention will become more clear to the reader after careful consideration is given to the detailed discussion thereof which follows.

BRIEF DESCRIPTION OF THE ACCOMPANYING DRAWINGS

Reference will be hereinafter made to the accompanying drawings wherein like reference numerals throughout the various figures denote like structural elements and wherein.

DETAILED DESCRIPTION OF THE PREFERRED EXEMPLARY EMBODIMENTS

Figure 1:
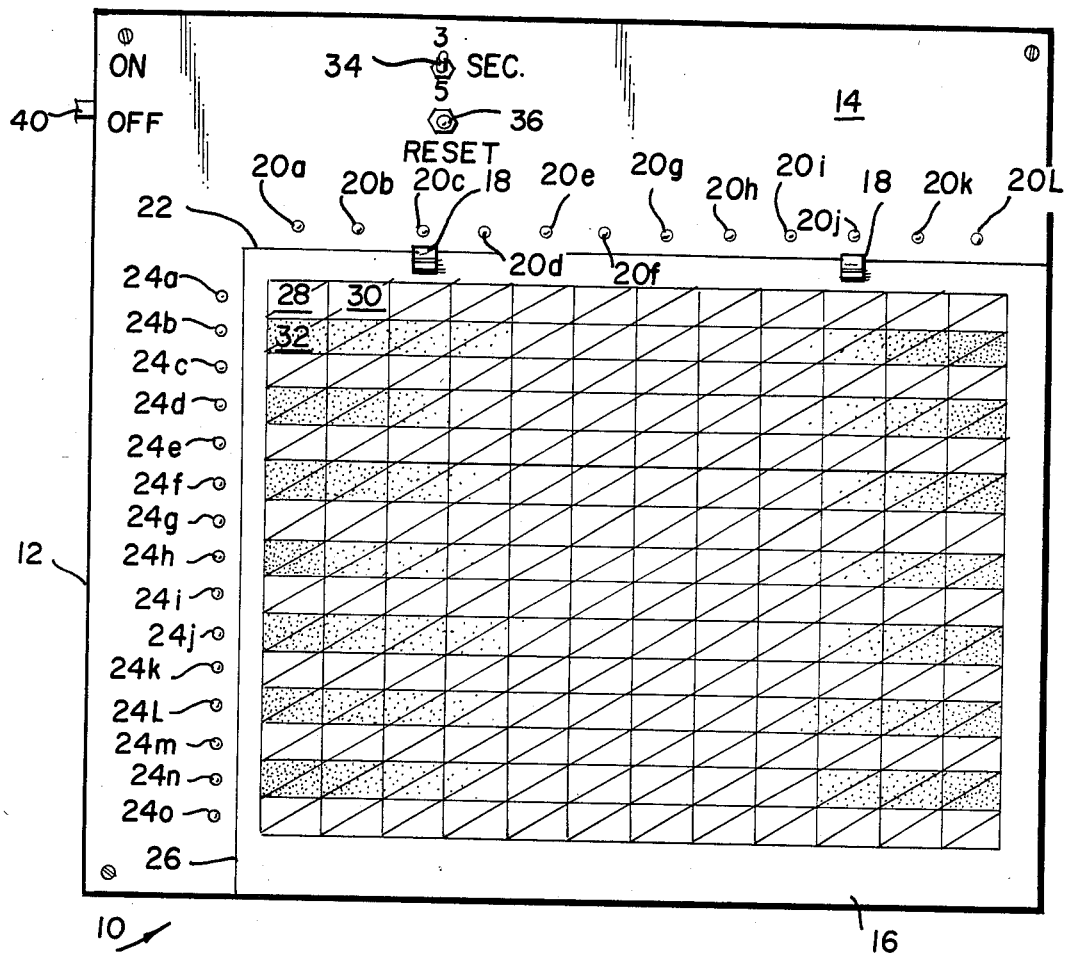
FIG. 1 is a top plan view of one embodiment of the device in accordance with the present invention.

Referring to FIG. 1, it is seen that the device 10 of the present invention includes a case body 12 having an upper substantially planar surface 14 on which a data sheet 16 can be positioned. Data sheet 16 is preferably removably maintained on surface 14 by means of spring clips 18. A column of light-emitting diodes 20a–20l are disposed along the upper border 22 of data sheet 16, each of the diodes 20a–20l identifying a respective column on data sheet 16. Similarly, a column of light-emitting diodes 24a–24o are disposed along the left side border 26 of data sheet 16, each diode 24a–24o thereby identifying a row of data sheet 16.

At $T_0$ (i.e. beginning time), diode pair 20a/24a is illuminated so as to visually identify box 28 on data sheet 16. After a predetermined time interval has elapsed, diode 20a will be extinguished and diode 20b will then be sequentially illuminated while diode 24a maintains its illumination to thereby visually identify box 30 of data sheet 16. This sequence continues along the row visually identified by diode 24a until diode 20l has been illuminated and extinguished. At this time, diode 20a will be reilluminated while diode 24b is illuminated (diode 24a thus being extinguished) to thereby visually identify box 32 on data sheet 16.

Sequential illumination of diodes 20a–20l occurs as above described. That is, each time diode 20l is extinguished, diode 20a will be reilluminated while the next sequential diode 24a–24o is illuminated to visually identify a successive row on data sheet 16. This visual identification is continued until the observed activity terminates or until a pre-established time interval has elapsed. Each box, for example, box 22 of data sheet 16 can be sub-divided by upper and lower portions by means of a diagonal line so as to permit the entry of two types of data (such as when pupil/teacher interaction behavior is observed). Of course, should only one type of data (such as either pupil or teacher behavior) be entered subdivision of box 22, for example, is unnecessary on data sheet 16.

While twelve diodes 20a–20l and fifteen diodes 24a–24o are depicted in the accompanying drawing as comprising the visual indicating members, the reader should appreciate that n diodes to visually identify n columns and m diodes to visually identify m rows are well within the contemplation of the present invention.

The time interval between successive illumination of diodes is preferably selected by means of a switch 34 accessible to the user of the device. Furthermore, a reset button 36 is provided so as to reset the circuitry (as will be described in greater detail below) to $t_o$ (e.g. to illuminate diode pair 20a/24a). A power switch 40 is provided so as to couple a self-contained battery (not shown) to the operational circuitry.

Figure 2:
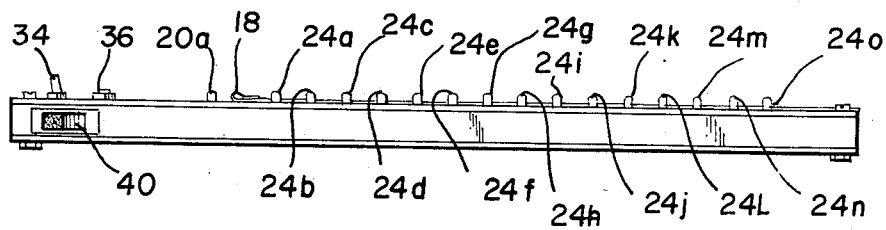
FIG. 2 is a left side elevational view of the embodiment depicted in FIG. 1.
Figure 3:
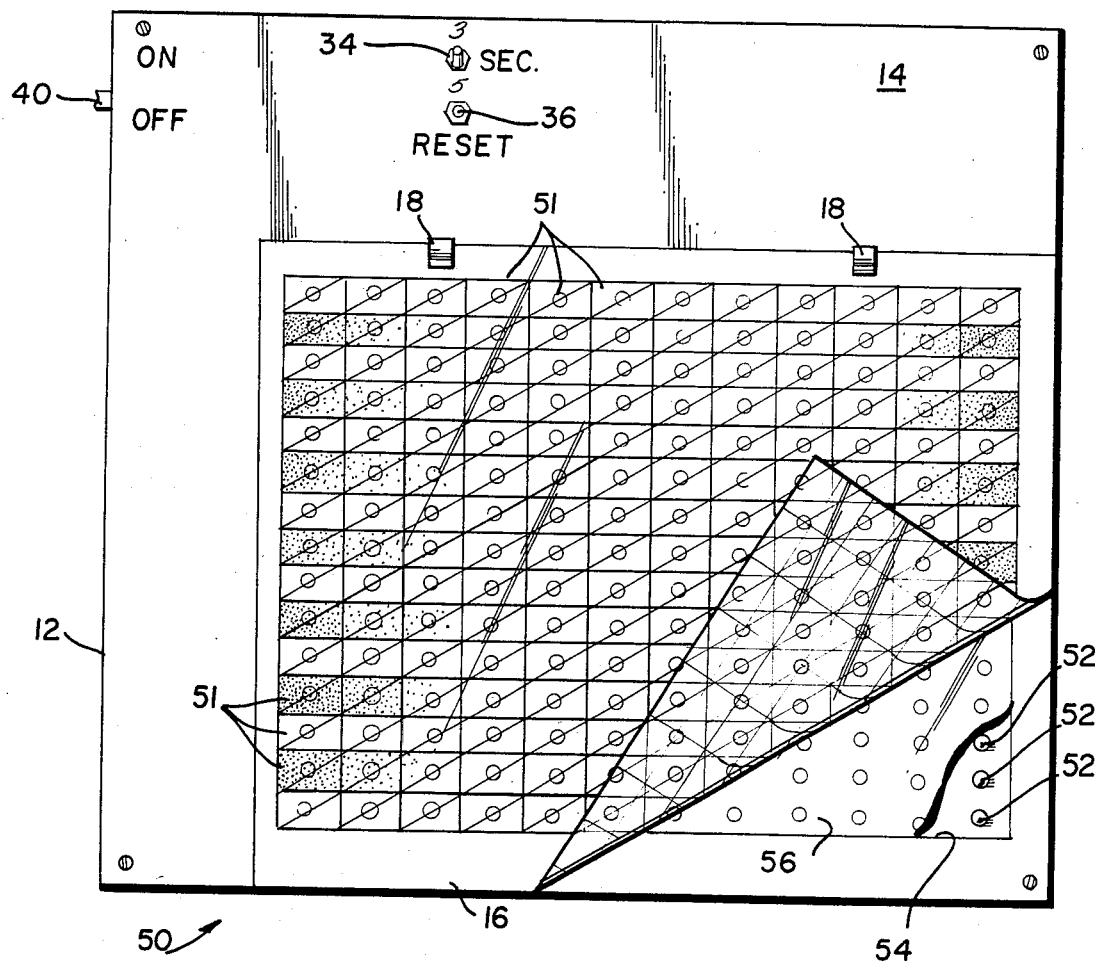
FIG. 3 is a top plan view of a second embodiment of the present invention showing a corner thereof exposed and partially sectioned.

A particularly preferred embodiment of the present invention is shown in accompanying FIG. 3. As can be seen therein, device 50 is similar to device 10 discussed above with respect to FIGS. 1 and 2 with the notable exception that diodes 52 are arranged in a matrix-configuration within cavity 54 of case body 12. The matrix configuration of diodes 52 is such that each corresponds with a respective box 51 on data sheet 16. A rigid light-transparent member 56 covers cavity 54 so that when diodes 52 are illuminated, the emitted light will be perceived by the observer and thus will directly visually identify a particular box 51 of data sheet 16 corresponding to a given time during the observation time interval. As can be appreciated, data sheet 16 should also be substantially light-transparent, e.g. thin film, paper or like medium so that the emitted light will be visible through both transparent member 56 and data sheet 16.

Figure 4:
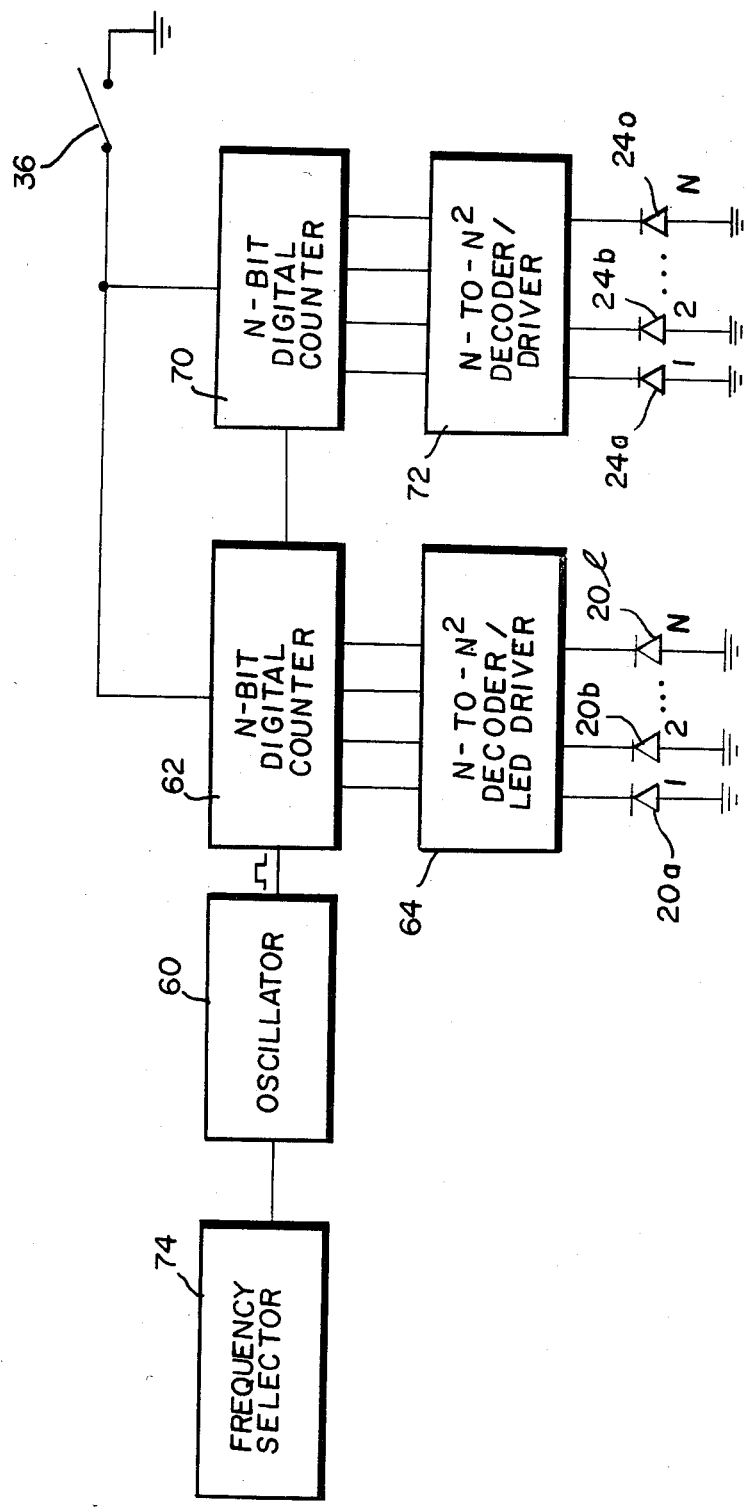
FIG. 4 is a schematic diagram of the timing and light-emitting circuitry used in the present invention.

As shown in FIG. 4, the circuitry of the present invention generally includes an oscillator 60 generating a digital frequency output which is received by digital counter 62 which in turn is coupled to an n-to-$n^2$ decoder/LED driver 64. Thus, decoder/driver 64 sequentially illuminates LEDs 20a–20l as described previously. A carry output from counter 62 is transferred to n-bit digital counter 70 which in turn is coupled to an n-to-$n^2$ decoder/driver 72 utilized to sequentially illuminate LEDs 24a–24o. Switch 34 (see FIGS. 1 and 3) operates frequency selector 74 so that the output frequency of oscillator 60 can be varied between predetermined time intervals (preferably intervals of 3 or 5 seconds). Reset button 36 resets each counter 62, 70 so as to illuminate LED pair 20a/24a.

As can be appreciated by one in the art, the backlighted embodiment depicted in FIG. 3 would only need counter 62 and decoder/LED driver 64 of proper N values so as to sequentially illuminate the diodes 52 rather than the dual digital counter 62, 70 and their respective decoder/LED drivers 64, 72 as depicted in FIG. 4.

Thus, while the present invention has been described in what is presently conceived to be the most preferred embodiments thereof, those in this art may recognize that many modifications may be made hereof, which modifications shall be accorded the broadest scope of the appended claims so as to encompass all equivalent structures, devices and assemblies.

What is claimed is:

1. A device to aid an operator in the recordation of time-based data comprising:
   a case body defining a surface upon which data indicia are scribable at plural predetermined locations;
   timing means for generating a sequence of uniformly timed output signals; and
   visual locating means operatively connected to said timing means and fixed to said case body to define said locations upon said surface, said visual locating means for receiving said uniformly timed output signals to visually identify one of said locations corresponding to a given time in response to said timing means generating a timed output signal indicative of said given time and for enabling an operator to visually locate said one location by virtue of said visual locating means so that data indicia for said given time is scribed at said one location,
   said visual locating means comprising pairs of light-emitting elements corresponding to each of said locations, wherein said pairs of light-emitting elements are sequentially illuminated in response to receiving said uniformly timed output signals from said timing means, each said illuminated pair of light-emitting elements thereby visually identifying one of said locations corresponding to said given time.

2. A device to aid an operator in the manual recordation of time-based data comprising:
   means defining a surface;
   record means establishing a plurality of discrete areas arranged in plural columns and rows on said surface for accepting data indicia scribed thereon by the operator; and
   visual means in operative association with said surface and in registry with each said area, said visual means for visually identifying each said area at respective given times in dependence upon a timed sequence of uniform time intervals to enable the operator to visually locate an area corresponding to one respective given time and to thereby ensure that data corresponding to said one given time is manually scribed by the operator in said visually-identified area, said visual means including (a) a row of plural first light-emitting means each to identify a respective column of said discrete areas and (b) a column of plural second light-emitting means each to identify a respective row of said discrete areas, wherein said visual means includes means for illuminating lightemitting pairs in response to said sequence of uniform time intervals, each said light-emitting pair consisting of one said first light-emitting means and one said second light-emitting means, for visually identifying the column and row, respectively, of said area corresponding to a respective said one given time during said timed sequence to thereby enable the operator to visually locate and scribe data upon said area corresponding to said respective one given time.

3. A device to aid an operator in the manual recordation of time-based data comprising:

a case body which defines a surface, consisting essentially of a light-transparent material;

record means establishing a plurality of discrete areas for accepting data indicia scribed thereon by the operator;

visual means for visually identifying each said area at respective given times in dependence upon a timed sequence of uniform time intervals to enable the operator to visually locate an area corresponding to one respective given time and to thereby ensure that data corresponding to said one given time is manually scribed by the operator in said visually-identified area, wherein said visual means includes plural light-emitting means each disposed in said cavity so as to be positioned below and in registered alignment with a respective one of said discrete areas, said light-emitting means for emitting light of sufficient intensity to permit the operator to visually perceive said emitted light through said light-transparent material when an exterior portion of said surface is viewed; and means for sequentially illuminating one said lightemitting means after another said light-emitting means in response to elapse of said uniform time intervals of said timed sequence to cause said emitted light to visually illuminate said areas in registered alignment with said one and another lightemitting means, respectively, thereby to enable the operator to visually locate and scribe data corresponding to said one given time.

4. A device as in claim 2 or 3 wherein said visual means further includes timing means for establishing said timed sequence.

5. A device as in claim 4 further comprising means to permit the operator to select a timed sequence of a first time interval or a second time interval different in time duration than said first interval.

6. A device as in claim 2 or 3 further comprising means to removably attach said record means to said surface defining means.

7. A device as in claim 2 or 3 further comprising reset means connected to said visual means to reset said visual means to a beginning time mode.

8. A device as in claim 2 wherein said first and second light-emitting means are light-emitting diodes.

9. A device to aid an operator in the recordation of time-based data comprising:

a case body including means defining a surface consisting essentially of a light-transparent material upon which data indicia are scribable at plural predetermined locations;

timing means for generating a sequence of uniformly timed output signals; and visual locating means operatively connected to said timing means and fixed to said case body to define said locations upon said surface, said visual locating means for receiving said sequence of uniformly timed output signals to visually identify one of said locations corresponding to a given time in response to said timing means generating a timed output signal indicative of said given time and for enabling an operator to visually locate said one location by virtue of said visual locating means so that data indicia for said given time is scribed at said one location, wherein said case body also defines an interior cavity below said surface, said visual locating means including plural lightemitting means positioned within said cavity so as to be subjacent to said surface and in registry with respective ones of said locations, said light-emitting means being sequentially illuminated in response to receiving said sequence of uniformly timed output signals of said timing means to thereby emit light of sufficient intensity to permit an operator to visually perceive the same through said light-transparent surface whereby said one location corresponding to said given time is visually identified.

10. A device as in claim 9 wherein each said lightemitting means is a light-emitting diode.

* * * * *